US012674082B2

(12) United States Patent
Kitajima

(10) Patent No.: US 12,674,082 B2
(45) Date of Patent: Jul. 7, 2026

(54) ADHESIVE COMPOSITION AND ADHESIVE SHEET

(71) Applicant: Soken Chemical & Engineering Co., Ltd., Tokyo (JP)

(72) Inventor: Shota Kitajima, Sayama (JP)

(73) Assignee: Soken Chemical & Engineering Co., Ltd., Tokyo (JP)

( * ) Notice: Subject to any disclaimer, the term of this patent is extended or adjusted under 35 U.S.C. 154(b) by 431 days.

(21) Appl. No.: 18/005,363

(22) PCT Filed: Jun. 29, 2021

(86) PCT No.: PCT/JP2021/024447
§ 371 (c)(1),
(2) Date: Jan. 13, 2023

(87) PCT Pub. No.: WO2022/014313
PCT Pub. Date: Jan. 20, 2022

(65) Prior Publication Data
US 2023/0265319 A1 Aug. 24, 2023

(30) Foreign Application Priority Data
Jul. 16, 2020 (JP) ................................. 2020-122157

(51) Int. Cl.
*C09J 133/08* (2006.01)

(52) U.S. Cl.
CPC .................................. *C09J 133/08* (2013.01)

(58) Field of Classification Search
None
See application file for complete search history.

(56) References Cited

U.S. PATENT DOCUMENTS

| | | | |
|---|---|---|---|
| 8,992,720 B2 | 3/2015 | Bharti et al. | |
| 2012/0088111 A1 | 4/2012 | Higo et al. | |
| 2012/0285618 A1 | 11/2012 | Bharti et al. | |
| 2018/0072928 A1 | 3/2018 | Chatterjee et al. | |
| 2020/0270490 A1 | 8/2020 | Shiraishi et al. | |

FOREIGN PATENT DOCUMENTS

| | | | | |
|---|---|---|---|---|
| JP | 2007070491 A | 3/2007 | | |
| JP | 2008024755 A | 2/2008 | | |
| JP | 2008260903 A | 10/2008 | | |
| JP | 2010084068 A | 4/2010 | | |
| JP | 2013511594 A | 4/2013 | | |
| JP | 6150536 B2 * | 6/2017 | | |
| JP | 2020063376 A | 4/2020 | | |
| WO | 2019087816 A1 | 5/2019 | | |
| WO | WO-2020004355 A1 * | 1/2020 | ............. | B32B 27/00 |

OTHER PUBLICATIONS

Shiraishi et al., WO 2019087816, May 9, 2019 (machine translation) (Year: 2019).*
Shiraishi et al., WO 2019087816, May 9, 2019 (human translation of Table 1) (Year: 2019).*
Hashimoto, WO-2020004355-A1, Jan. 2, 2020 (machine translation) (Year: 2020).*
Takada et al., JP-6150536-B2, Jun. 21, 2017 (machine translation) (Year: 2017).*

* cited by examiner

*Primary Examiner* — Cheng Yuan Huang
(74) *Attorney, Agent, or Firm* — The Webb Law Firm

(57) ABSTRACT

An aspect of the present invention relates to an adhesive composition or an adhesive sheet, and the adhesive composition contains a (meth)acrylic polymer (A) which is a polymer of monomer components including, in specific amounts, at least one (meth)acrylic acid ester selected from an alkoxyalkyl (meth)acrylate ester and a specific alkyl (meth)acrylate ester, a crosslinkable functional group-containing monomer (excluding an amino group-containing monomer), and an amino group-containing monomer, an acid-modified polyolefin (B), a specific tackifier resin (C), and a crosslinking agent (D), and satisfies specific requirements (I) to (III).

8 Claims, No Drawings

ADHESIVE COMPOSITION AND ADHESIVE SHEET

CROSS-REFERENCE TO RELATED APPLICATIONS

This application is the United States national phase of International Patent Application No. PCT/JP2021/024447 filed Jun. 29, 2021, and claims priority to Japanese Patent Application No. 2020-122157 filed Jul. 16, 2020, the disclosures of which are hereby incorporated by reference in their entireties.

BACKGROUND OF THE INVENTION

Field of the Invention

An aspect of the present invention relates to an adhesive composition or an adhesive sheet.

Background Art

Materials used for, for example, automobiles are being replaced from metal materials to plastic materials. This is because of the demand for a decrease in weight of automobiles and the progress of an increase in the strength of plastic materials.

However, the plastic material is generally a difficult-to-adhere adherend compared to the metal material. In particular, inexpensive and versatile polyolefins such as polypropylene and polyethylene are known as difficult-to-adhere adherends.

Recently, members for automobiles are also required to have high heat resistance. In addition, when the members are bonded using an adhesive, the bonding may be performed while applying heat, so it is also required to exhibit favorable adhesive strength even after the adhesive is exposed to a thermal environment.

Incidentally, there has been proposed a pressure sensitive adhesive composition containing a polyisobutylene polymer having a first functional group and an acrylic polymer having a second functional group present in the backbone of the acrylic polymer, in which the first functional group and the second functional group form a hydrogen bond (see, for example, Patent Literature 1: JP 2013-511594 A). It is disclosed that the pressure sensitive adhesive composition disclosed in Patent Literature 1 has favorable adhesiveness with respect to various substrates such as a low-surface-energy substrate.

SUMMARY OF THE INVENTION

Technical Problem

According to the studies of the present inventors, it has been found that, in a conventionally proposed adhesive composition, an adhesive layer exposed to a thermal environment does not have a sufficient adhesive strength.

An aspect of the present invention provides an adhesive composition capable of forming an adhesive layer that maintains a sufficient adhesive strength even when exposed to a thermal environment at the time of bonding or after bonding.

DESCRIPTION OF THE INVENTION

Solution to Problem

The present inventors have conducted intensive studies in order to solve the above problems. As a result, the present inventors have found that the above problems can be solved by an adhesive composition having the following configuration, thereby completing the present invention.

Examples of aspects of the present invention are, for example, the following [1] to [7].

[1] An adhesive composition containing:
a (meth)acrylic polymer (A) which is a polymer of monomer components including 55 to 99 mass % of at least one (meth)acrylic acid ester selected from an alkoxyalkyl (meth)acrylate ester and an alkyl (meth)acrylate ester having an alkyl group having 4 to 12 carbon atoms, 0.5 to 15 mass % of a crosslinkable functional group-containing monomer (excluding an amino group-containing monomer), and 0.01 to 5 mass % of an amino group-containing monomer;
an acid-modified polyolefin (B);
at least one tackifier resin (C) selected from a rosin tackifier resin (C1) and a terpene phenol tackifier resin (C2); and
a crosslinking agent (D),
the adhesive composition satisfying the following requirements (I) to (III):
(I) a value of a ball tack test performed by a J. Dow method using an adhesive layer having a thickness of 50 μm obtained from the adhesive composition is 5 or less,
(II) an adhesive force in measurement after an adhesive surface of an adhesive layer having a thickness of 50 μm obtained from the adhesive composition is bonded to a polypropylene plate and left to stand for 20 minutes in an environment at 80° C. is 10.0 N/25 mm or more, and
(III) when a test piece in which an adhesive surface of an adhesive layer having a thickness of 50 μm obtained from the adhesive composition is bonded to a polypropylene plate in an area of 50 mm×20 mm is left to stand for 20 minutes in an environment at 80° C. and then a load of 200 g is applied to an end portion on one end side in a longitudinal direction of the test piece in an environment at 80° C., a peeling amount of the adhesive layer after 1 hour from the start of application of a load is 30 mm or less.

[2] The adhesive composition described in [1], in which the amino group of the amino group-containing monomer is a tertiary amino group.

[3] The adhesive composition described in [1] or [2], in which the (meth)acrylic polymer (A) is a polymer of monomer components including 60 to 94 mass % of an alkyl (meth)acrylate ester having an alkyl group having 4 to 12 carbon atoms, 0.5 to 15 mass % of a crosslinkable functional group-containing monomer (excluding the amino group-containing monomer), 0.01 to 5 mass % of the amino group-containing monomer, and 5 to 30 mass % of an alkyl (meth)acrylate ester having an alkyl group having 1 to 3 carbon atoms.

[4] The adhesive composition described in any one of [1] to [3], in which the crosslinkable functional group-containing monomer (excluding the amino group-containing monomer) is (meth)acrylic acid.

[5] The adhesive composition described in any one of [1] to [4], in which the adhesive composition contains 5 to 20 parts by mass of the acid-modified polyolefin (B) and 5 to 50 parts by mass of the tackifier resin (C) with respect to 100 parts by mass of the (meth)acrylic polymer (A).

[6] The adhesive composition described in any one of [1] to [5], in which a haze of an adhesive layer having a thickness of 50 μm obtained from the adhesive composition is less than 35%.

[7] An adhesive sheet including: a substrate; and an adhesive layer provided on the substrate, the adhesive layer being obtained from the adhesive composition described in any one of [1] to [6].

Advantageous Effects of Invention

According to an aspect of the present invention, it is possible to provide an adhesive composition capable of forming an adhesive layer that maintains a sufficient adhesive strength even when exposed to a thermal environment at the time of bonding or after bonding.

Description of Embodiments

Hereinafter, the present invention will be specifically described. In the following description, acryl and methacryl are also collectively referred to as "(meth)acryl", and acrylate and methacrylate are also collectively referred to as "(meth)acrylate".

[Adhesive Composition]

An adhesive composition according to an aspect of the present invention contains a (meth)acrylic polymer (A), an acid-modified polyolefin (B), a tackifier resin (C), and a crosslinking agent (D), and satisfies the following requirements (I) to (III).

(I) a value of a ball tack test performed by a J. Dow method using an adhesive layer having a thickness of 50 μm obtained from the adhesive composition is 5 or less, (II) an adhesive force in measurement after an adhesive surface of an adhesive layer having a thickness of 50 μm obtained from the adhesive composition is bonded to a polypropylene plate and left to stand for 20 minutes in an environment at 80° C. is 10.0 N/25 mm or more, and (III) when a test piece in which an adhesive surface of an adhesive layer having a thickness of 50 μm obtained from the adhesive composition is bonded to a polypropylene plate in an area of 50 mm×20 mm is left to stand for 20 minutes in an environment at 80° C. and then a load of 200 g is applied to an end portion on one end side in a longitudinal direction of the test piece in an environment at 80° C., a peeling amount of the adhesive layer after 1 hour from the start of application of a load is 30 mm or less.

Regarding the above (I) to (III), physical properties related to the above (I) to (III) can be measured as follows: after defoaming, the adhesive composition is applied onto a polyethylene terephthalate (PET) film having a thickness of 25 μm to have a dried thickness of 50 μm, the adhesive composition is dried at 90° C. for 3 minutes to remove a solvent, thereby forming a coating film, a release-treated PET film is then bonded to a surface of the coating film (adhesive layer) on a side opposite to a surface in contact with the PET film, the resulting laminate is left to stand still for 7 days under the condition of 23° C./50% RH and aged to produce an adhesive sheet having the adhesive layer having a thickness of 50 μm (layer configuration: the PET film/the adhesive layer/the release-treated PET film), the release-treated PET film is peeled off from the adhesive sheet to expose the adhesive layer, and the exposed adhesive layer is used as an adhesive surface. The haze described below can be measured by peeling the release-treated PET film off from the adhesive sheet obtained by the above method and using a laminate including the PET film/the adhesive layer.

The measurement of each physical property related to the above (I) to (III) can be performed by the method described in Examples.

In the adhesive composition, (I) a value of a ball tack test performed by a J. Dow method using an adhesive layer having a thickness of 50 μm obtained from the adhesive composition is 5 or less, preferably 4 or less, and more preferably 3 or less. Within the above range, when the adhesive sheet is bonded to an adherend, even in a case where the adhesive sheet is bonded to a wrong position, the adhesive sheet can be easily peeled off and can be bonded to a predetermined position again, which is preferable.

In the adhesive composition, (II) an adhesive force in measurement after an adhesive surface of an adhesive layer having a thickness of 50 μm obtained from the adhesive composition is bonded to a polypropylene plate and left to stand for 20 minutes in an environment at 80° C. is 10.0 N/25 mm or more, preferably 13.0 N/25 mm or more, and more preferably 15.0 N/25 mm or more. Within the above range, a favorable adhesive force is exhibited after heat bonding, which is preferable. The adhesive force is preferably high, and the upper limit thereof is not particularly limited, but is usually 50.0 N/25 mm or less.

In the adhesive composition, (III) when a test piece in which an adhesive surface of an adhesive layer having a thickness of 50 μm obtained from the adhesive composition is bonded to a polypropylene plate in an area of 50 mm×20 mm is left to stand for 20 minutes in an environment at 80° C. and then a load of 200 g is applied to an end portion on one end side in a longitudinal direction of the test piece in an environment at 80° C., a peeling amount of the adhesive layer after 1 hour from the start of application of a load is 30 mm or less, preferably 28 mm or less, and more preferably 25 mm or less. Within the above range, it can be said that a sufficient adhesive strength is exhibited even under a thermal environment, which is preferable. The peeling amount is preferably small, and the lower limit thereof is not particularly limited.

The adhesive composition according to an aspect of the present invention can satisfy the above (I) to (III) by using a combination of a (meth)acrylic polymer (A) that is a polymer of specific monomer components and an acid-modified polyolefin (B) and containing a specific tackifier resin (C) and a crosslinking agent (D), and an adhesive layer formed from the adhesive composition can maintain a sufficient adhesive strength even when exposed to a thermal environment at the time of bonding or after bonding.

Since the adhesive composition according to an aspect of the present invention has such properties, the adhesive composition can be suitably used for use application of being bonded under a thermal environment, for example, for forming an adhesive layer of a decorative film.

In the adhesive composition according to an aspect of the present invention, the haze of the adhesive layer having a thickness of 50 μm obtained from the adhesive composition is preferably less than 35% and more preferably 25% or less. When the haze is within the above range, the respective components in the adhesive composition tend to be uniformly mixed, which is preferable. The haze is preferably as low as possible, and the lower limit thereof is not particularly limited, but is usually 0.5% or more. The measurement of the haze can be performed by the method described in Examples.

((Meth)Acrylic Polymer (A))

The (meth)acrylic polymer (A) contained in the adhesive composition is a polymer of monomer components including 55 to 99 mass % of at least one (meth)acrylic acid ester selected from an alkoxyalkyl (meth)acrylate ester and an alkyl (meth)acrylate ester having an alkyl group having 4 to 12 carbon atoms, 0.5 to 15 mass % of a crosslinkable functional group-containing monomer (excluding an amino group-containing monomer), and 0.01 to 5 mass % of an amino group-containing monomer. The amount (mass %) of each monomer represents the amount in 100 mass % of the monomer components.

The weight average molecular weight (Mw) of the (meth) acrylic polymer (A) is usually 150000 to 1800000, preferably 200000 to 1500000, and more preferably 400000 to 1300000. The weight average molecular weight is a molecular weight determined in terms of standard polystyrene by a gel permeation chromatographic (GPC) method, and can be measured by the method described in Examples. In the above range, the coatability of the adhesive composition and the durability of an adhesive layer to be obtained are excellent, which is preferable.

Examples of the alkyl (meth)acrylate ester having an alkyl group having 4 to 12 carbon atoms include n-butyl (meth) acrylate, iso-butyl (meth)acrylate, tert-butyl (meth)acrylate, pentyl (meth)acrylate, hexyl (meth)acrylate, heptyl (meth) acrylate, 2-ethylhexyl (meth)acrylate, octyl (meth)acrylate, nonyl (meth)acrylate, decyl (meth)acrylate, undecyl (meth) acrylate, and lauryl (meth)acrylate.

The number of carbon atoms of the alkyl group and the alkoxy group in the alkoxyalkyl (meth)acrylate ester is not particularly limited, but is preferably 1 to 12.

Examples of the alkoxyalkyl (meth)acrylate ester include methoxymethyl (meth)acrylate, 2-methoxyethyl (meth) acrylate, 2-ethoxyethyl (meth)acrylate, 3-methoxypropyl (meth)acrylate, 3-ethoxypropyl (meth)acrylate, 4-methoxybutyl (meth)acrylate, and 4-ethoxybutyl (meth)acrylate.

As the at least one (meth)acrylic acid ester selected from an alkoxyalkyl (meth)acrylate ester and an alkyl (meth) acrylate ester having an alkyl group having 4 to 12 carbon atoms, n-butyl (meth)acrylate, 2-methoxyethyl (meth)acrylate, and 2-ethylhexyl acrylate are preferable, and n-butyl acrylate (BA) and 2-methoxyethyl acrylate (MEA) are more preferable. The at least one (meth)acrylic acid ester selected from an alkoxyalkyl (meth)acrylate ester and an alkyl (meth) acrylate ester having an alkyl group having 4 to 12 carbon atoms may be used singly, or two or more kinds thereof may be used.

The monomer components include the at least one (meth) acrylic acid ester selected from an alkoxyalkyl (meth)acrylate ester and an alkyl (meth)acrylate ester having an alkyl group having 4 to 12 carbon atoms in an amount of 55 to 99 mass %, preferably 60 to 94 mass %, and more preferably 65 to 90 mass %, in 100 mass % of the monomer components.

Examples of the crosslinkable functional group-containing monomer include a carboxy group-containing monomer and a hydroxyl group-containing monomer. In the present invention, an amino group-containing monomer is not included in the crosslinkable functional group-containing monomer.

Examples of the carboxy group-containing monomer include carboxy group-containing (meth)acrylates such as (meth)acrylic acid, β-carboxyethyl (meth)acrylate, 5-carboxypentyl (meth)acrylate, succinic acid mono(meth)acryloyloxyethyl ester, and ω-carboxypolycaprolactone mono (meth)acrylate; itaconic acid, crotonic acid, fumaric acid, and maleic acid.

Examples of the hydroxyl group-containing monomer include 2-hydroxyethyl (meth)acrylate, 2-hydroxypropyl (meth)acrylate, 4-hydroxybutyl (meth)acrylate, 6-hydroxyhexyl (meth)acrylate, and 8-hydroxyoctyl (meth)acrylate.

The crosslinkable functional group-containing monomer may be used singly, or two or more kinds thereof may be used.

When the crosslinkable functional group-containing monomer is (meth)acrylic acid, heat resistance after bonding the adherend and the adhesive layer tends to be more excellent, which is preferable.

The monomer components include the crosslinkable functional group-containing monomer in an amount of 0.5 to 15 mass %, preferably 0.8 to 15 mass %, and more preferably 1 to 13 mass %, in 100 mass % of the monomer components. When the content of the crosslinkable functional group-containing monomer is in the above range, an adhesive sheet which does not cause curing failure and is excellent in balance of adhesive properties is obtained.

The amino group-containing monomer is a monomer having an amino group in the molecule. The amino group-containing monomer may be a monomer having one amino group in one molecule, or may be a monomer having two or more amino groups in one molecule. The amino group-containing monomer is preferably a monomer having one to three amino groups in one molecule, and more preferably a monomer having one amino group in one molecule.

When the amino group of the amino group-containing monomer is a primary or secondary amino group, since there is a possibility that the amino group chemically reacts with the acid-modified site of the acid-modified polyolefin and the (meth)acrylic polymer component and the modified polyolefin component are crosslinked to cause, for example, gelation, the amino group is preferably a tertiary amino group.

Examples of the amino group-containing monomer include N,N-dialkylaminoalkyl (meth)acrylates such as N,N-dimethylaminoethyl (meth)acrylate and N,N-diethylaminoethyl (meth)acrylate. As the amino group-containing monomer, N,N-dimethylaminoethyl methacrylate (DM) and N,N-diethylaminoethyl methacrylate (DE) are preferable. The amino group-containing monomer may be used singly, or two or more kinds thereof may be used.

The monomer components include the amino group-containing monomer in an amount of 0.01 to 5 mass %, and preferably 0.01 to 3 mass %, in 100 mass % of the monomer components. When the content of the amino group-containing monomer is in the above range, an adhesive composition excellent in compatibility with the acid-modified polyolefin (B) described below and excellent in coatability is obtained.

As the monomer components, the at least one (meth) acrylic acid ester selected from an alkoxyalkyl (meth)acrylate ester and an alkyl (meth)acrylate ester having an alkyl group having 4 to 12 carbon atoms, the crosslinkable functional group-containing monomer (excluding the amino group-containing monomer), the amino group-containing monomer, and monomers other than these monomers (hereinafter, also referred to as "other monomers") may be included.

Examples of the other monomers include an alkyl (meth) acrylate ester having an alkyl group having 1 to 3 carbon atoms, an alicyclic hydrocarbon group-containing (meth) acrylate, and an aromatic hydrocarbon group-containing (meth)acrylate.

The other monomers may be used singly or two or more kinds thereof may be used.

Examples of the alkyl (meth)acrylate ester having an alkyl group having 1 to 3 carbon atoms include methyl (meth)acrylate, ethyl (meth)acrylate, n-propyl (meth)acrylate, and iso-propyl (meth)acrylate. The alkyl (meth)acrylate ester having an alkyl group having 1 to 3 carbon atoms is preferably methyl acrylate (MA). The alkyl (meth)acrylate ester having an alkyl group having 1 to 3 carbon atoms may be used singly, or two or more kinds thereof may be used. When the monomer components include an alkyl (meth)acrylate ester having an alkyl group having 1 to 3 carbon atoms, heat resistance and durability of an adhesive sheet to be obtained are improved, which is preferable.

Examples of the alicyclic hydrocarbon group-containing (meth)acrylate include cyclohexyl (meth)acrylate, isobornyl (meth)acrylate, and adamantyl (meth)acrylate.

Examples of the aromatic hydrocarbon group-containing (meth)acrylate include benzyl (meth)acrylate, phenyl (meth)acrylate, and phenoxyethyl (meth)acrylate.

The monomer components are preferably monomer components including 60 to 94 mass % of an alkyl (meth)acrylate ester having an alkyl group having 4 to 12 carbon atoms, 0.5 to 15 mass % of a crosslinkable functional group-containing monomer (excluding an amino group-containing monomer), 0.01 to 5 mass % of an amino group-containing monomer, and 5 to 30 mass % of an alkyl (meth)acrylate ester having an alkyl group having 1 to 3 carbon atoms, and more preferably monomer components including 65 to 90 mass % of an alkyl (meth)acrylate ester having an alkyl group having 4 to 12 carbon atoms, 0.8 to 15 mass % of a crosslinkable functional group-containing monomer (excluding an amino group-containing monomer), 0.01 to 3 mass % of an amino group-containing monomer, and 8 to 25 mass % of an alkyl (meth)acrylate ester having an alkyl group having 1 to 3 carbon atoms.

When the alicyclic hydrocarbon group-containing (meth)acrylate and the aromatic hydrocarbon group-containing (meth)acrylate are used as the other monomers, the total content thereof is preferably 0.5 to 15 mass % with respect to 100 mass % of the monomer components.

(Production Condition of (Meth)Acrylic Polymer (A))

The (meth)acrylic polymer (A) is obtained by copolymerizing the monomer components.

As the copolymerization method, for example, the (meth)acrylic polymer (A) can be produced by a conventionally known polymerization method such as a solution polymerization method, a bulk polymerization method, an emulsion polymerization method, or a suspension polymerization method, and among these, a solution polymerization method is preferable.

For example, the (meth)acrylic polymer (A) can be obtained by charging a polymerization solvent and the monomer components into a reaction vessel, adding a polymerization initiator in an inert gas atmosphere such as nitrogen gas, setting the reaction initiation temperature to usually 40 to 100° C. and preferably 50 to 90° C., and performing the reaction for 3 to 20 hours while maintaining the reaction system at usually 50 to 90° C. and preferably 60 to 90° C.

Examples of the polymerization initiator include a peroxide polymerization initiator and an azo initiator.

Examples of the peroxide polymerization initiator include t-butyl hydroperoxide, cumene hydroperoxide, dicumyl peroxide, benzoyl peroxide, lauroyl peroxide, caproyl peroxide, di-iso-propyl peroxydicarbonate, di-2-ethylhexyl peroxydicarbonate, tert-butyl peroxypivalate, 2,2-bis(4,4-di-tert-butylperoxycyclohexyl)propane, 2,2-bis(4,4-di-tert-amylperoxycyclohexyl)propane, 2,2-bis(4,4-di-tertoctylperoxycyclohexyl)propane, 2,2-bis(4,4-di-α-cumyl peroxycyclohexyl)propane, 2,2-bis(4,4-di-tert-butylperoxy-cyclohexyl)butane, and 2,2-bis(4,4-di-tert-octylperoxycy-clohexyl) butane.

Examples of the azo initiator include azo compounds such as 2,2'-azobisisobutyronitrile, 2,2'-azobis(4-methoxy-2,4-di-methylvaleronitrile), 2,2'-azobis(2-cyclopropylpropioni-trile), 2,2'-azobis(2,4-dimethylvaleronitrile), 2,2'-azobis(2-methylbutyronitrile), 1,1'-azobis(cyclohexane-1-carbonitrile), 2-(carbamoylazo)isobutyronitrile, 2-phenylazo-4-methoxy-2,4-dimethylvaleronitrile, 2,2'-azo-bis(2-amidinopropane)dihydrochloride, 2,2'-azobis(N,N'-di-methylene isobutyramidine), 2,2'-azobis[2-methyl-N-(2-hy-droxyethyl)-propionamide], 2,2'-azobis(isobutyramide) dihydrate, 4,4'-azobis(4-cyanopentanoic acid), 2,2'-azobis (2-cyanopropanol), dimethyl-2,2'-azobis(2-methylpropionate), and 2,2'-azobis(2-methyl-N-(2-hydroxyethyl)propionamide).

The polymerization initiator may be used singly or two or more kinds thereof may be used. It is not limited that the polymerization initiator is added a plurality of times during the polymerization.

The polymerization initiator is used in an amount within a range of usually 0.001 to 5 parts by mass and preferably 0.005 to 3 parts by mass, with respect to 100 parts by mass of the monomer components forming the (meth)acrylic polymer (A). A polymerization initiator, a chain transfer agent, a polymerizable monomer, and a polymerization solvent may be appropriately added during the polymerization reaction.

Examples of the polymerization solvent used for solution polymerization include aromatic hydrocarbons such as benzene, toluene, and xylene; aliphatic hydrocarbons such as n-pentane, n-hexane, n-heptane, and n-octane; alicyclic hydrocarbons such as cyclopentane, cyclohexane, cyclohep-tane, and cyclooctane; ethers such as diethyl ether, diiso-propyl ether, 1,2-dimethoxyethane, dibutyl ether, tetrahy-drofuran, dioxane, anisole, phenylethyl ether, and diphenyl ether; halogenated hydrocarbons such as chloroform, carbon tetrachloride, 1,2-dichloroethane, and chlorobenzene; esters such as ethyl acetate, propyl acetate, butyl acetate, and methyl propionate; ketones such as acetone, methyl ethyl ketone, diethyl ketone, methyl isobutyl ketone, and cyclo-hexanone; amides such as N,N-dimethylformamide, N,N-dimethylacetamide, and N-methylpyrrolidone; nitriles such as acetonitrile and benzonitrile; and sulfoxides such as dimethyl sulfoxide and sulfolane.

The polymerization solvent may be used singly or two or more kinds thereof may be used.

(Acid-Modified Polyolefin (B))

The acid-modified polyolefin (B) contained in the adhesive composition is not particularly limited as long as it is a polymer obtained by modifying a polyolefin using an acid.

The acidic group of the acid-modified polyolefin (B) and the amino group of the (meth)acrylic polymer (A) interact with each other, whereby the phase separation between the (meth)acrylic polymer (A) and the acid-modified polyolefin (B) is suppressed even after these components are mixed. It is considered that the acid-modified polyolefin (B) is unevenly distributed on the surface of an adhesive sheet to be obtained from the adhesive composition containing the acid-modified polyolefin (B) to form islands of a sea-island structure, and it is considered that such unevenness can make the ball tack of the adhesive layer 5 or less.

Examples of the acid-modified polyolefin (B) include carboxylic anhydride-modified polyolefins. Examples of the carboxylic anhydride-modified polyolefins include maleic anhydride-modified polyolefin, itaconic anhydride-modified polyolefin, and aconitic anhydride-modified polyolefin. Among these, maleic anhydride-modified polyolefin using maleic anhydride as a carboxylic anhydride is preferable from the viewpoint of ease of availability as an industrial product.

The polyolefin before modification is preferably a polymer of an olefin having 2 to 4 carbon atoms, and may be a homopolymer or a copolymer. The polyolefin is preferably polyethylene (including an ethylene homopolymer and a copolymer containing ethylene as a main component), or polypropylene (including a propylene homopolymer and a copolymer containing propylene as a main component).

The weight average molecular weight (Mw) of the acid-modified polyolefin (B) measured by a GPC method is usually within a range of 10,000 to 300,000, preferably within a range of 20,000 to 200,000, and more preferably within a range of 50,000 to 100,000.

The acid-modified polyolefin (B) may be used singly or two or more kinds thereof may be used.

The blending amount of the acid-modified polyolefin (B) in the adhesive composition is usually 5 to 20 parts by mass, preferably 6 to 18 parts by mass, and more preferably 7 to 16 parts by mass, with respect to 100 parts by mass of the (meth)acrylic polymer (A). When the blending amount of the acid-modified polyolefin (B) is in the above range, an adhesive sheet exhibiting high adhesiveness even after heating tends to be obtained, which is preferable.

(Tackifier Resin (C))

The tackifier resin (C) contained in the adhesive composition is at least one tackifier resin (C) selected from a rosin tackifier resin (C1) and a terpene phenol tackifier resin (C2).

The weight average molecular weight (Mw) of the tackifier resin (C) is usually 500 to 5000, preferably 600 to 5000, and more preferably 1000 to 4500. The weight average molecular weight is a molecular weight determined in terms of standard polystyrene by a gel permeation chromatographic (GPC) method, and can be measured by the method described in Examples.

The hydroxyl value of the tackifier resin (C) is usually to 200 mgKOH/g, preferably 15 to 150 mgKOH/g, and more preferably 20 to 150 mgKOH/g. The hydroxyl value can be measured by the method described in Examples.

The Mw and the hydroxyl value of the tackifier resin (C) in the above ranges are preferable from the viewpoint that the compatibility with the (meth)acrylic polymer (A) is excellent, and a decrease in adhesive force after bonding and aging of an adhesive sheet to be obtained can be suppressed.

The rosin tackifier resin (C1) is not particularly limited as long as it is a rosin tackifier resin, but a rosin tackifier resin having a softening point of 100° C. or higher is preferably used. The softening point is preferably 100 to 200° C. and more preferably 120 to 160° C., from the viewpoint of imparting stress relaxation in a high-temperature environment.

Examples of the rosin tackifier resin (C1) include PENSEL C (softening point: 120° C.), PENSEL D-125 (softening point: 125° C.), PENSEL D-135 (softening point: 135° C.), PENSEL D-160 (softening point: 160° C.), SUPER ESTER A-100 (SEA-100) (softening point: 100° C.), SUPER ESTER A-115 (softening point: 115° C.), and SUPER ESTER A-125 (softening point: 125° C.) manufactured by ARAKAWA CHEMICAL INDUSTRIES, LTD., and HARITACK PCJ (softening point: 123° C.), HARITACK DP-2669 (softening point: 135° C.), and HARITACK FK125 (softening point: 125° C.) manufactured by Harima Chemicals Group, Inc.

The terpene phenol tackifier resin (C2) is not particularly limited, but for example, a resin obtained by polymerizing terpene in the presence of phenol is used, and a terpene phenol tackifier resin having a softening point of 100° C. or higher is preferably used. The softening point is preferably 100 to 200° C. and more preferably 120 to 160° C., from the viewpoint of imparting stress relaxation in a high-temperature environment.

Examples of the terpene phenol tackifier resin (C2) include YS POLYSTER G150 (softening point: 150° C.), YS POLYSTER T100 (softening point: 100° C.), YS POLYSTER G125 (softening point: 125° C.), YS POLYSTER T115 (softening point: 115° C.), YS POLYSTER T145 (softening point: 145° C.), YS POLYSTER T130 (softening point: 130° C.), and YS POLYSTER U130 (softening point: 130° C.). The above products are manufactured by YASUHARA CHEMICAL CO., LTD.

The tackifier resin (C) may be used singly, or two or more kinds thereof may be used.

The blending amount of the tackifier resin (C) in the adhesive composition is usually 5 to 50 parts by mass, preferably 6 to 40 parts by mass, and more preferably 7 to 30 parts by mass, with respect to 100 parts by mass of the (meth)acrylic polymer (A). When the blending amount of the tackifier resin (C) is in the above range, an adhesive sheet excellent in heat resistance is obtained without losing the balance of adhesive properties, which is preferable.

(Crosslinking Agent (D))

The crosslinking agent (D) contained in the adhesive composition is not particularly limited as long as it can crosslink the (meth)acrylic polymer (A). As the crosslinking agent (D), for example, a crosslinking agent capable of reacting with a crosslinkable functional group of the polymer, such as an isocyanate compound (D1), an epoxy compound (D2), or a metal chelate compound (D3), can be used.

Since the adhesive composition contains the crosslinking agent (D), a crosslinked body is formed in the adhesive layer bonded to an adherend by, for example, pressure bonding or thermoforming, and the adhesive composition is excellent in adhesive force and heat resistance.

The crosslinking agent (D) may be used singly, or two or more kinds thereof may be used.

(Isocyanate Compound (D1))

As the isocyanate compound, for example, an isocyanate compound having the number of isocyanate groups of 2 or more in one molecule is usually used, and the number of isocyanate groups in one molecule is preferably 2 to 8 and more preferably 3 to 6. The number of isocyanate groups in the above range is preferable from the viewpoint of the efficiency of the crosslinking reaction between the (meth)acrylic polymer (A) or the acid-modified polyolefin (B) and the isocyanate compound and the viewpoint of maintaining the flexibility of the adhesive layer.

Examples of the diisocyanate compound having the number of isocyanate groups of 2 or more in one molecule include aliphatic diisocyanates, alicyclic diisocyanates, and aromatic diisocyanates.

Examples of the aliphatic diisocyanates include aliphatic diisocyanates having 4 to 30 carbon atoms such as ethylene diisocyanate, tetramethylene diisocyanate, pentamethylene diisocyanate, hexamethylene diisocyanate, 2-methyl-1,5-pentane diisocyanate, 3-methyl-1,5-pentane diisocyanate, and 2,2,4-trimethyl-1,6-hexamethylene diisocyanate.

Examples of the alicyclic diisocyanates include alicyclic diisocyanates having 7 to 30 carbon atoms such as isophorone diisocyanate, cyclopentyl diisocyanate, cyclohexyl diisocyanate, hydrogenated xylylene diisocyanate, hydrogenated tolylene diisocyanate, hydrogenated diphenylmethane diisocyanate, and hydrogenated tetramethylxylene diisocyanate.

Examples of the aromatic diisocyanates include aromatic diisocyanates having 8 to 30 carbon atoms such as phenylene diisocyanate, tolylene diisocyanate, xylylene diisocyanate, naphthalene diisocyanate, diphenyl ether diisocyanate, diphenylmethane diisocyanate, and diphenylpropane diisocyanate.

Examples of the isocyanate compound having the number of isocyanate groups of 3 or more in one molecule include aromatic polyisocyanates, aliphatic polyisocyanates, and alicyclic polyisocyanates. Specific examples thereof include 2,4,6-triisocyanate toluene, 1,3,5-triisocyanate benzene, and 4,4',4"-triphenylmethane triisocyanate.

Examples of the isocyanate compound include a multimer (e.g.: a dimer or trimer, a biuret, or an isocyanurate), a derivative (e.g.: an addition reaction product of a polyhydric alcohol and two or more molecules of a diisocyanate compound), and a polymer of the isocyanate compound having the number of isocyanate groups of 2 or 3. Examples of the polyhydric alcohol in the derivative include, as low-molecular-weight polyhydric alcohols, trihydric or higher alcohols such as trimethylolpropane, glycerin, and pentaerythritol, and, as high-molecular-weight polyhydric alcohols, polyether polyol, polyester polyol, acryl polyol, polybutadiene polyol, and polyisoprene polyol.

Examples of such an isocyanate compound include a trimer of diphenylmethane diisocyanate, a biuret or isocyanurate of polymethylene polyphenyl polyisocyanate, hexamethylene diisocyanate, or tolylene diisocyanate, a reaction product of trimethylolpropane and tolylene diisocyanate or xylylene diisocyanate (e.g.: a trimolecular adduct of tolylene diisocyanate or xylylene diisocyanate), a reaction product of trimethylolpropane and hexamethylene diisocyanate (e.g.: a trimolecular adduct of hexamethylene diisocyanate), polyether polyisocyanate, and polyester polyisocyanate.

Among the isocyanate compounds, from the viewpoint of hardly yellowing, xylylene diisocyanate crosslinking agents and hexamethylene diisocyanate crosslinking agents are preferable, and from the viewpoint of stress relaxation, a tolylene diisocyanate crosslinking agent is preferable. Examples of the xylylene diisocyanate crosslinking agent include xylylene diisocyanate and a multimer, a derivative, and a polymer thereof, examples of the hexamethylene diisocyanate crosslinking agent include hexamethylene diisocyanate and a multimer, a derivative, and a polymer thereof, and examples of the tolylene diisocyanate crosslinking agent include tolylene diisocyanate and a multimer, a derivative, and a polymer thereof.

(Epoxy Compound (D2))

Examples of the epoxy compound include compounds having two or more epoxy groups in the molecule, and examples thereof include ethylene glycol diglycidyl ether, polyethylene glycol diglycidyl ether, glycerin diglycidyl ether, glycerin triglycidyl ether, 1,6-hexanediol diglycidyl ether, trimethylolpropane triglycidyl ether, diglycidyl aniline, diamineglycidylamine, N,N,N',N'-tetraglycidyl-m-xylylenediamine, and 1,3-bis(N,N'-diamineglycidylaminomethyl).

(Metal Chelate Compound (D3))

Examples of the metal chelate compound include compounds in which, for example, alkoxide, acetylacetone, or ethyl acetoacetate is coordinated to a polyvalent metal such as aluminum, iron, copper, zinc, tin, titanium, nickel, antimony, magnesium, vanadium, chromium, or zirconium. Specific examples thereof include aluminum isopropylate, aluminum secondary butyrate, aluminum ethyl acetoacetate diisopropylate, aluminum trisethyl acetoacetate, and aluminum trisacetylacetonate.

The blending amount of the crosslinking agent (D) in the adhesive composition is usually 0.01 to 5 parts by mass, preferably 0.02 to 4 parts by mass, and more preferably 0.03 to 3 parts by mass, with respect to 100 parts by mass of the (meth)acrylic polymer (A).

(Organic Solvent (E))

The adhesive composition may contain an organic solvent (E) in order to adjust the coatability.

Examples of the organic solvent (E) include the same organic solvent as the polymerization solvent described in the section of (Production Condition of (Meth)Acrylic Polymer (A)) described above. The polymerization solvent used at the time of producing the (meth)acrylic polymer (A) and the organic solvent contained in the adhesive composition may be the same kind of organic solvent or may be different kinds of organic solvents. The organic solvent may be used singly, or two or more kinds thereof may be used.

When the adhesive composition contains the organic solvent (E), the content of the organic solvent (E) is usually 30 to 90 mass % and preferably 40 to 90 mass %, with respect to 100 mass % of the adhesive composition.

(Additive (F))

The adhesive composition may contain an additive (F) as long as the effect of the present invention is not impaired, in addition to the components (A) to (E).

Examples of the additive (F) include a (meth)acrylic polymer other than the (meth)acrylic polymer (A), a tackifier resin other than the tackifier resin (C), a silane coupling agent, an antistatic agent, an antioxidant, a light stabilizer, a metal corrosion inhibitor, a plasticizer, a crosslinking accelerator, a surfactant, and a rework agent. The respective additives (F) may be used singly, or two or more kinds thereof may be used. The content of the additive (F) when the adhesive composition contains the additive (F) also varies depending on the type of the additive (F) and is not particularly limited, but is usually 0.01 to 20 mass % and preferably 0.01 to 15 mass %, with respect to 100 mass % of the adhesive composition.

(Preparation of Adhesive Composition)

The adhesive composition can be prepared, for example, by mixing the respective components by a conventionally known method. For example, the adhesive composition can be prepared by mixing a solution containing the (meth)acrylic polymer (A), the acid-modified polyolefin (B), the tackifier resin (C), the crosslinking agent (D), and other components such as an additive to be used as necessary.

[Adhesive Sheet]

An adhesive sheet according to an aspect of the present invention includes a substrate and an adhesive layer provided on the substrate, the adhesive layer being obtained from the above-described adhesive composition.

Examples of the adhesive sheet include a double-sided adhesive sheet which includes a substrate and adhesive layers formed on both surfaces of the substrate and in which at least one of the adhesive layers is an adhesive layer formed from the adhesive composition according to an aspect of the present invention, a single-sided adhesive sheet which includes a substrate and an adhesive layer formed from the adhesive composition according to an aspect of the present invention on one surface of the substrate, and an adhesive sheet in which substrates are disposed on both surfaces of an adhesive layer formed from the adhesive composition according to an aspect of the present invention.

The substrate is not particularly limited, and examples thereof include a plastic substrate, a nonwoven fabric, a woven fabric, paper, a metal, glass, and ceramics. The thickness of the substrate varies depending on, for example, the use application of the substrate and is not particularly limited, but is usually 10 to 500 μm.

Examples of the plastic substrate include a plastic substrate selected from polyethylene terephthalate (PET), polyvinyl chloride, a polyolefin (polypropylene, polyethylene, or TPO (olefinic thermoplastic elastomer)), polymethyl methacrylate, polycarbonate, polyimide, and ABS.

The substrate may be a release-treated substrate. When the adhesive sheet is an adhesive sheet in which substrates are disposed on both surfaces of an adhesive layer formed from the adhesive composition according to an aspect of the present invention, at least one of the substrates is a release-treated substrate, and the release-treated substrate is removed at the time of adhesion to an adherend.

The thickness of the adhesive layer is usually 5 to 200 μm and preferably 10 to 100 μm, from the viewpoint of maintaining adhesive performance.

At least a part of the adhesive layer may be crosslinked by reaction of the (meth)acrylic polymer (A) and the crosslinking agent (D) in the adhesive composition during the production process.

A method for producing an adhesive sheet is not particularly limited, and is, for example, as follows. The above-described adhesive composition is applied onto a substrate. When the adhesive composition contains a solvent, the adhesive composition is dried at usually 50 to 150° C. and preferably 60 to 100° C., for usually 1 to 10 minutes and preferably 2 to 7 minutes to remove the solvent, thereby forming a coating film. Subsequently, another substrate is bonded to the surface of the coating film (adhesive layer) on which the substrate is not provided. Subsequently, the resulting laminate is cured for 1 day or longer and preferably 3 to 10 days in an environment of usually 5 to 60° C. and preferably 15 to 40° C. and usually 30 to 70% RH and preferably 40 to 70% RH to produce an adhesive sheet. The curing is also referred to as aging. When the aging is performed under the above conditions, crosslinking proceeds during aging, and a crosslinked body can be efficiently formed.

As the method for applying the adhesive composition, methods for applying the adhesive composition to have a predetermined thickness by a known method, for example, a spin coating method, a knife coating method, a roll coating method, a bar coating method, a blade coating method, a die coating method, a gravure coating method, or a doctor blade method, can be used.

The present inventors consider that, in the adhesive layer obtained from the adhesive composition, the acid-modified polyolefin (B) is unevenly distributed in the vicinity of the interface and the surface of the adhesive layer has fine irregularities. It is considered that the surface of the adhesive layer is excellent in reworkability after bonding to the adherend because of the fine irregularities. It is considered that, by bonding the adhesive layer by pressure bonding or thermoforming, fine irregularities are eliminated, and the adhesive layer can be firmly bonded to the adherend.

Since the adhesive sheet can maintain a sufficient adhesive strength even when exposed to a thermal environment at the time of bonding or after bonding, the adhesive sheet can be used for various use applications. The adhesive sheet can be suitably used, for example, as a decorative film to be bonded under a thermal environment.

EXAMPLES

Next, an aspect of the present invention will be more specifically described with reference to Examples; however, the present invention is not limited thereto.

Production Example 1

Into a reaction apparatus including a stirrer, a reflux condenser, a thermometer, and a nitrogen inlet tube, 89.9 parts by mass of n-butyl acrylate (BA), 0.1 parts by mass of N,N-dimethylaminoethyl methacrylate (DM), 10 parts by mass of acrylic acid (AA), and 100 parts by mass of ethyl acetate were charged, and the temperature was raised to 80° C. while a nitrogen gas was introduced. Subsequently, 0.1 parts by mass of 2,2'-azobisisobutyronitrile was added, and a polymerization reaction was performed at 80° C. for 6 hours under a nitrogen gas atmosphere, thereby obtaining an acrylic polymer (A-1). After completion of the reaction, the mixture was diluted with ethyl acetate to prepare a polymer solution having a solid content concentration of 30 mass %.

Production Example 2

An acrylic polymer (A-2) was produced by the same method as in Production Example 1, except that the monomer components to be used were changed to those shown in Table 1, and a polymer solution having a solid content concentration of 30 mass % was prepared.

In Table 1, MEA means 2-methoxyethyl acrylate.

Production Example 3

Into a reaction apparatus including a stirrer, a reflux condenser, a thermometer, and a nitrogen inlet tube, 69.9 parts by mass of n-butyl acrylate (BA), 20 parts by mass of methacrylate (MA), 0.1 parts by mass of N,N-dimethylaminoethyl methacrylate (DM), 10 parts by mass of acrylic acid (AA), and 100 parts by mass of ethyl acetate were charged, and the temperature was raised to 80° C. while a nitrogen gas was introduced. Subsequently, 0.1 parts by mass of 2,2'-azobisisobutyronitrile was added, and a polymerization reaction was performed at 80° C. for 6 hours under a nitrogen gas atmosphere, thereby obtaining an acrylic polymer (A-3). After completion of the reaction, the mixture was diluted with ethyl acetate to prepare a polymer solution having a solid content concentration of 30 mass %.

Production Examples 4 to 13

Acrylic polymer (A-4) to (A-10) and (A'-1) to (A'-3) were produced by the same method as in Production Example 3, except that the monomer components to be used were changed as shown in Table 1, and polymer solutions having a solid content concentration of 30 mass % were prepared.

In Table 1, 2HEA means 2-hydroxyethyl acrylate.

In Production Examples 6 to 8, acrylic polymers each having a different molecular weight were produced by adjusting the solvent amount (ethyl acetate amount) in Production Example 3.

The weight average molecular weights (Mw) of the acrylic polymers (A-1) to (A-10) and (A'-1) to (A'-3) were determined as Mw in terms of standard polystyrene by a gel permeation chromatographic (GPC) method under the following conditions. The Mw of each polymer is shown in Table 1.

Measuring device: HLC-8120GPC (manufactured by Tosoh Corporation)

GPC column configuration: following 5 columns (all manufactured by Tosoh Corporation)

(1) TSK-GEL HXL-H (guard column)

(2) TSK-GEL G7000HXL (3) TSK-GEL GMHXL (4) TSK-GEL GMHXL (5) TSK-GEL G2500HXL

Sample concentration: diluted with tetrahydrofuran to have a concentration of 1.0 mg/cm$^3$ Mobile phase solvent: tetrahydrofuran Flow rate: 1.0 cm$^3$/min Column temperature: 40° C.

TABLE 1

| | | Prod. Ex. 1 A-1 | Prod. Ex. 2 A-2 | Prod. Ex. 3 A-3 | Prod. Ex. 4 A-4 | Prod. Ex. 5 A-5 | Prod. Ex. 6 A-6 | Prod. Ex. 7 A-7 |
|---|---|---|---|---|---|---|---|---|
| Monomer | BA | 89.9 | | 69.9 | 66.9 | 74.9 | 69.9 | 69.9 |
| | MEA | | 89.9 | | | | | |
| | MA | | | 20 | 20 | 20 | 20 | 20 |
| | DM | 0.1 | 0.1 | 0.1 | 0.1 | 0.1 | 0.1 | 0.1 |
| | AA | 10 | 10 | 10 | 13 | 5 | 10 | 10 |
| | 2HEA | | | | | | | |

16

TABLE 1-continued

| Mw [×10$^4$] | | 50 | 50 | 50 | 50 | 50 | 20 | 80 |
|---|---|---|---|---|---|---|---|---|

| | | Prod. Ex. 8 A-8 | Prod. Ex. 9 A-9 | Prod. Ex. 10 A-10 | Prod. Ex. 11 A'-1 | Prod. Ex. 12 A'-2 | Prod. Ex. 13 A'-3 |
|---|---|---|---|---|---|---|---|
| Monomer | BA | 69.9 | 74.9 | 79.9 | 70 | 59.9 | 79.9 |
| | MEA | | | | | | |
| | MA | 20 | 20 | 10 | 20 | 20 | 20 |
| | DM | 0.1 | 0.1 | 0.1 | | 0.1 | 0.1 |
| | AA | 10 | | 10 | 10 | 20 | 0 |
| | 2HEA | | 5 | | | | |
| Mw [×10$^4$] | | 120 | 50 | 50 | 50 | 50 | 50 |

Examples 1 to 16 and Comparative Examples 1 to 6

The polymer solutions containing the acrylic polymer (A-1) to (A-10) and (A'-1) to (A'-3) obtained in Production Examples 1 to 13, the acid-modified polyolefin (B), the tackifier resin (C), and the crosslinking agent (D) were mixed in the amounts (parts by mass) shown in Tables 3 and 4 below to obtain adhesive compositions. The numerical values shown in Tables 3 and 4 are solid content ratios, and the amount of the acrylic polymer shown in Tables 3 and 4 is not the amount of the polymer solution but the amount of the acrylic polymer.

In Examples and Comparative Examples, an isocyanate crosslinking agent L-45 (manufactured by Soken Chemical & Engineering Co., Ltd.) was used as the crosslinking agent (D).

The acid-modified polyolefin (B), the tackifier resin (C), and the tackifier resin other than the tackifier resin (C) (in the table, simply described as "tackifier resin") used in Examples and Comparative Examples are shown in Table 2. The weight average molecular weight (Mw) in Table 2 was measured under the same conditions as the method for measuring the Mw of the acrylic polymers obtained in Production Examples 1 to 13. The hydroxyl value was determined in accordance with JIS K 0070 by acetylating a polymer molecule or a hydroxyl group of a (meth)acrylic polymer with acetic anhydride, and then neutralizing and titrating excess acetic acid with potassium hydroxide.

TABLE 2

| | No. | Manufacturer | Product No. | Molecular weight (Mw) | Melting point (° C.) |
|---|---|---|---|---|---|
| Acid-modified polyolefin (B) | B-1 | TOYOBO CO., LTD. | PMA-L | 75000 | 70 |
| | B-2 | TOYOBO CO., LTD. | PMA-LE | 55000 | 70 |
| | B-3 | TOYOBO CO., LTD. | PMA-KE | 60000 | 80 |

| | No. | Manufacturer | Product No. | Type | Softening point (° C.) | Molecular weight (Mw) | Hydroxyl value (mgKOH/g) |
|---|---|---|---|---|---|---|---|
| Tackifier resin (C) | C-1 | ARAKAWA CHEMICAL INDUSTRIES, LTD. | PENSEL D-135 | Polymerized rosin ester | 135 | 3068 | 48.2 |
| | C-2 | ARAKAWA CHEMICAL INDUSTRIES, LTD. | SEA-100 | Special rosin ester | 100 | 820 | 19.1 |
| | C-3 | YASUHARA CHEMICAL CO., LTD. | YS POLYSTER T130 | Terpene phenol resin | 130 | 1232 | 33.4 |

TABLE 2-continued

| | | | | | | | |
|---|---|---|---|---|---|---|---|
| | C-4 | YASUHARA CHEMICAL CO., LTD. | YS POLYSTER U130 | Terpene phenol resin | 130 | 1184 | 20.9 |
| | C-5 | YASUHARA CHEMICAL CO., LTD. | YS POLYSTER G125 | Terpene phenol resin | 125 | 1116 | 93.8 |
| Tackifier resin | M-100 | ARAKAWA CHEMICAL INDUSTRIES, LTD. | ARKON M-100 | Aliphatic saturated hydrocarbon resin | 100 | 1193 | 4.2 |

<Production of Adhesive Sheet>

After defoaming, the obtained adhesive composition was applied onto a polyethylene terephthalate (PET) film (Lu-mirror #25-T60, manufactured by Toray Industries, Inc., haze: about 0.8%) having a thickness of 25 μm using a doctor blade to have a dried thickness of 50 μm, and the adhesive composition was dried at 90° C. for 3 minutes to remove the solvent, thereby forming a coating film.

A release-treated PET film was bonded to a surface of the coating film (adhesive layer) on a side opposite to a surface in contact with the PET film. Thereafter, the resulting laminate was left to stand still for 7 days under the condition of 23° C./50% RH and aged to produce an adhesive sheet (1) having the adhesive layer having a thickness of 50 μm.

<Test>

(Haze)

The release-treated PET film was peeled off from the adhesive sheet (1), and the haze value of a laminate including the PET film/the adhesive layer was measured as the haze value of the adhesive layer.

The haze was measured in accordance with JIS K 7105 using a haze meter (model name: HM-150, manufactured by Murakami Color Research Laboratory). The results are shown in Tables 3 and 4.

(Ball Tack)

Measured by J. Dow Method

The release-treated PET film was peeled off from the adhesive sheet (1) and the adhesive sheet (1) was attached to an inclined surface having an inclination angle of 30 degrees so that the adhesive layer was exposed. Next, a steel ball was allowed to approach from the upper side of the inclined surface in an environment of 23° C./50% RH, and then slid on the adhesive surface (approach distance: 10 cm, sliding distance: 10 cm).

A sliding test was performed while changing the diameter of the steel ball, and the maximum diameter of the steel ball stopped sliding in the surface of the adhesive layer was measured. The diameter of the steel balls used is X/32 inches (X is an integer in a range of 2 to 32). The X at the maximum diameter of the steel ball is shown in Tables 3 and 4 as a result of the ball tack test. Examples and Comparative Examples in which the steel ball did not stopped even when X is 2 were described as "Not stopped" in Tables 3 and 4.

(Adhesive Force)

The adhesive sheet (1) was cut into a size of 25 mm×100 mm to obtain a test piece. The release-treated PET film was peeled off from the obtained test piece, the exposed adhesive layer was bonded to a polypropylene (PP) plate (PP-N-BN (dimension: 70 mm×150 mm×2 mm (thickness)), manufactured by Showa Denko Materials Co., Ltd.), and press-bonded by moving a 2 kg roller three times back and forth, and then the test piece was left to stand for 20 minutes in an environment of 23° C./50% RH. Thereafter, the adhesive force (N/25 mm) when the test piece end portion was pulled at a speed of 300 mm/min in the 180° direction with respect to the PP plate surface in an environment of 23° C./50% RH was measured. The adhesive force at this time was described as "adhesive force to PP initial stage" in Tables 3 and 4.

The adhesive sheet (1) was cut into a size of 25 mm×100 mm to obtain a test piece. The release-treated PET film was peeled off from the obtained test piece, the exposed adhesive layer was bonded to a polypropylene (PP) plate, and press-bonded by moving a 2 kg roller three times back and forth, and then the test piece was left to stand for 20 minutes in an 80° C./dry environment. Thereafter, the test piece was left to stand for 20 minutes in an environment of 23° C./50% RH, and then the adhesive force when the test piece end portion was pulled at a speed of 300 mm/min in the 180° direction with respect to the PP plate surface was measured. The adhesive force (N/25 mm) at this time was described as "adhesive force to PP after heating" in Tables 3 and 4.

(Adhesive Force after Bonding and Aging)

The adhesive sheet (1) was cut into a size of 25 mm×100 mm to obtain a test piece. The release-treated PET film was peeled off from the obtained test piece, the exposed adhesive layer was bonded to a polypropylene (PP) plate (PP-N-BN), and press-bonded by moving a 2 kg roller three times back and forth, and then the test piece was left to stand for 500 hours an environment at 80° C. Thereafter, the test piece was left to stand for 20 minutes in an environment of 50% RH, and then the adhesive force when the test piece end portion was pulled at a speed of 300 mm/min in the 180° direction with respect to the PP plate surface was measured.

(Constant Load Peeling)

The adhesive sheet (1) was cut into a size of 80 mm×20 mm. The release-treated PET film was peeled off from the cut adhesive sheet (1), the exposed adhesive layer was bonded to a polypropylene (PP) plate (PP-N-BN) to have a bonding area of 50 mm×20 mm, and press-bonded by moving a 2 kg roller three times back and forth, thereby obtaining a test piece. Thereafter, the obtained test piece was disposed so that the main surface thereof was substantially perpendicular to the gravity and the adhesive layer was positioned on the lower side of the PP plate with respect to the gravity, the test piece was left to stand still for 20 minutes in an 80° C./dry environment, a load of 200 g was applied to the end portion on one end side in the longitudinal direction of the test piece (the end portion on one end side in the longitudinal direction of the laminate including the PET film/the adhesive layer bonded to the test piece) in the same environment, and the peeling amount (mm) of the adhesive layer from the PP plate after 1 hour from the start of application of the load [the length from the end portion to which the load was applied to the place where the adhesive layer was peeled off from the PP plate] was measured. The results are described in Tables 3 and 4.

The description "minutes dropped" shown in Table 4 indicates that the adhesive layer was completely peeled off from the PP plate and dropped after minutes from the start of application of the load.

(Compatibility)

The acrylic polymers (A-1) to (A-10) and (A'-1) to (A'-3), the acid-modified polyolefin (B), and the tackifier resin (C) were charged in a container in amounts (parts by mass) shown in Tables 3 and 4, and then ethyl acetate was further added to have a solid content concentration of 30 mass % and mixed. After mixing, the mixture was left to stand for 24 hours, and compatibility was evaluated according to the following criteria. In the evaluation of compatibility, a crosslinking agent was not used.

AA: The phase separation was not confirmed.

BB: The phase separation was confirmed.

TABLE 3

| | | Example 1 | Example 2 | Example 3 | Example 4 |
|---|---|---|---|---|---|
| Acrylic polymer (A) | A-1 | 100 | | | |
| | A-2 | | 100 | | |
| | A-3 | | | 100 | 100 |
| | A-4 | | | | |
| | A-5 | | | | |
| | A-6 | | | | |
| | A-7 | | | | |
| | A-8 | | | | |
| | A-9 | | | | |
| | A-10 | | | | |
| Acid-modified polyolefin (B) | B-1 | 10 | 10 | 10 | 10 |
| Tackifier resin (C) | C-1 | 10 | 10 | 10 | |
| | C-3 | | | | 10 |
| Crosslinking agent (D) | L-45 | 2.5 | 2.5 | 2.5 | 2.5 |
| Haze (%) | | 15.2 | 52.5 | 22.8 | 2.1 |
| Ball tack | | 3 | Not stopped | Not stopped | Not stopped |
| Adhesive force to PP | Initial stage | 4.5 | 1.5 | 2.1 | 8.7 |
| (N/25 mm) | After heating | 19.0 | 21.7 | 22.2 | 20.5 |
| Constant load peeling to PP 80° C. 200 g load (mm) | | 7 | 4 | 2 | 3 |
| Compatibility evaluation | | AA | AA | AA | AA |
| Adhesive force after bonding and aging (80° C. × 500 h) | | 22.3 | 13.6 | 24.8 | 25.7 |

| | | Example 5 | Example 6 | Example 7 | Example 8 |
|---|---|---|---|---|---|
| Acrylic polymer (A) | A-1 | | | | |
| | A-2 | | | | |
| | A-3 | | | | |
| | A-4 | 100 | | | |
| | A-5 | | 100 | | |
| | A-6 | | | 100 | |
| | A-7 | | | | 100 |
| | A-8 | | | | |
| | A-9 | | | | |
| | A-10 | | | | |
| Acid-modified polyolefin (B) | B-1 | 10 | 10 | 10 | 10 |
| Tackifier resin (C) | C-1 | 10 | 10 | 10 | 10 |
| | C-3 | | | | |
| Crosslinking agent (D) | L-45 | 2.5 | 2.5 | 4.5 | 2.0 |
| Haze (%) | | 30.2 | 13.9 | 24.5 | 19.8 |
| Ball tack | | Not stopped | Not stopped | Not stopped | Not stopped |
| Adhesive force to PP | Initial stage | 0.3 | 3.5 | 3.5 | 1.5 |
| (N/25 mm) | After heating | 17.1 | 19.2 | 17.9 | 19.5 |
| Constant load peeling to PP 80° C. 200 g load (mm) | | 2 | 5 | 28 | 1 |
| Compatibility evaluation | | AA | AA | AA | AA |
| Adhesive force after bonding and aging (80° C. × 500 h) | | 21.2 | 23.8 | 23.8 | 23.7 |

| | | Example 9 | Example 10 | Example 11 |
|---|---|---|---|---|
| Acrylic polymer (A) | A-1 | | | |
| | A-2 | | | |
| | A-3 | | | |
| | A-4 | | | |
| | A-5 | | | |
| | A-6 | | | |
| | A-7 | | | |
| | A-8 | 100 | | |
| | A-9 | | 100 | |
| | A-10 | | | 100 |
| Acid-modified polyolefin (B) | B-1 | 10 | 10 | 10 |
| Tackifier resin (C) | C-1 | 10 | 10 | 10 |
| | C-3 | | | |
| Crosslinking agent (D) | L-45 | 1.0 | 1.0 | 2.5 |
| Haze (%) | | 18.1 | 17.4 | 19.2 |
| Ball tack | | Not stopped | Not stopped | Not stopped |
| Adhesive force to PP | Initial stage | 1.3 | 4.9 | 3.3 |
| (N/25 mm) | After heating | 16.7 | 14.4 | 20.2 |
| Constant load peeling to PP 80° C. 200 g load (mm) | | 0 | 15 | 4 |
| Compatibility evaluation | | AA | AA | AA |
| Adhesive force after bonding and aging (80° C. × 500 h) | | 19.1 | 15.5 | 23.9 |

TABLE 4

| | | Example 12 | Example 13 | Example 14 | Example 15 |
|---|---|---|---|---|---|
| Acrylic polymer (A) | A-3 | 100 | 100 | 100 | 100 |
| | A'-1 | | | | |
| | A'-2 | | | | |
| | A'-3 | | | | |
| Acid-modified polyolefin (B) | B-1 | | | 10 | 10 |
| | B-2 | 10 | | | |
| | B-3 | | 10 | | |
| Tackifier resin (C) | C-1 | 10 | 10 | | |
| | C-2 | | | 10 | |
| | C-4 | | | | 10 |
| | C-5 | | | | |
| Tackifier resin | M-100 | | | | |
| Crosslinking agent (D) | L-45 | 2.5 | 2.5 | 2.5 | 2.5 |
| Haze (%) | | 19.9 | 21.9 | 10.2 | 13.2 |
| Ball tack | | Not stopped | Not stopped | Not stopped | Not stopped |
| Adhesive force to PP | Initial stage | 2.5 | 1.7 | 4.1 | 7.8 |
| (N/25 mm) | After heating | 20.7 | 21.5 | 17.8 | 20.7 |
| Constant load peeling to PP 80° C. 200 g load (mm) | | 3 | 1 | 25 | 2 |
| Compatibility evaluation | | AA | AA | AA | AA |
| Adhesive force after bonding and aging (80° C. × 500 h) | | 23.7 | 24.3 | 20.2 | 23.2 |

| | | Example 16 | Comparative Example 1 | Comparative Example 2 | Comparative Example 3 |
|---|---|---|---|---|---|
| Acrylic polymer (A) | A-3 | 100 | | 100 | 100 |
| | A'-1 | | 100 | | |
| | A'-2 | | | | |
| | A'-3 | | | | |
| Acid-modified polyolefin (B) | B-1 | 10 | 10 | | 10 |
| | B-2 | | | | |
| | B-3 | | | | |
| Tackifier resin (C) | C-1 | | 10 | 10 | |
| | C-2 | | | | |
| | C-4 | | | | |
| | C-5 | 10 | | | |
| Tackifier resin | M-100 | | | | |
| Crosslinking agent (D) | L-45 | 2.5 | 2.5 | 2.5 | 2.5 |
| Haze (%) | | 1.5 | 22.1 | 21.5 | 0.8 |
| Ball tack | | Not stopped | Not stopped | 7 | 2 |
| Adhesive force to PP | Initial stage | 8.6 | 3.4 | 2.5(z) | 10.5 |
| (N/25 mm) | After heating | 21.2 | 18.0 | 3.6(z) | 15.2 |
| Constant load peeling to PP 80° C. 200 g load (mm) | | 2 | 55 minutes dropped | 1 minute dropped | 45 minutes dropped |
| Compatibility evaluation | | AA | BB | AA | AA |
| Adhesive force after bonding and aging (80° C. × 500 h) | | 23.6 | 21.9 | 3.2(z) | 17.5 |

| | | Comparative Example 4 | Comparative Example 5 | Comparative Example 6 |
|---|---|---|---|---|
| Acrylic polymer (A) | A-3 | | | 100 |
| | A'-1 | | | |
| | A'-2 | 100 | | |
| | A'-3 | | 100 | |
| Acid-modified polyolefin (B) | B-1 | 10 | 10 | 10 |
| | B-2 | | | |
| | B-3 | | | |
| Tackifier resin (C) | C-1 | 10 | 10 | |
| | C-2 | | | |
| | C-4 | | | |
| | C-5 | | | |
| Tackifier resin | M-100 | | | 10 |
| Crosslinking agent (D) | L-45 | 2.5 | 2.5 | 2.5 |
| Haze (%) | | 45.2 | 5.2 | 58.8 |
| Ball tack | | Not stopped | Not stopped | Not stopped |
| Adhesive force to PP | Initial stage | 0.1 | 8.2 | 1.5 |
| (N/25 mm) | After heating | 17.5 | 10.5 | 19.6 |
| Constant load peeling to PP 80° C. 200 g load (mm) | | 45 minutes dropped | 2 minutes dropped | 28 |
| Compatibility evaluation | | AA | AA | AA |
| Adhesive force after bonding and aging (80° C. × 500 h) | | 12.7 | 11.7 | 12.8 |

(z)in the adhesive force measurement indicates zipping during peeling

From Tables 3 and 4, it was shown that the adhesive sheets obtained from the adhesive compositions described in Examples 1 to 16 have a low ball tack value, an adhesive force to polypropylene after heating (adhesive force to PP after heating) of 10.0 N/25 mm or more, and a constant load peeling to polypropylene of 30 mm or less. In Comparative Example 1 using the acrylic polymer (A'-1) in which the amino group-containing monomer was not copolymerized, the evaluation of the constant load peeling test was poor, and the evaluation result of compatibility among the acrylic polymer, the acid-modified polyolefin (B), and the tackifier resin (C) was poor.

In Comparative Example 4 using the acrylic polymer (A'-2) in which a predetermined amount or more of the crosslinkable functional group-containing monomer was copolymerized and Comparative Example 5 using the acrylic polymer (A'-3) in which the crosslinkable functional group-containing monomer was not copolymerized, the evaluation result of the constant load peeling test was poor.

In the adhesive sheet (Comparative Example 2) obtained from the adhesive composition not containing the acid-modified polyolefin (B), the ball tack value was high, and the evaluation result of the adhesive force after heating was low.

In the adhesive sheet (Comparative Example 3) obtained from the adhesive composition not containing the tackifier resin (C), the evaluation of the constant load peeling test was poor, and in the adhesive sheet (Comparative Example 6) obtained from the adhesive composition not containing (C1) or (C2) and containing the tackifier resin other than (C1) and (C2), the evaluation result of the adhesive force after bonding and aging was poor as compared with the adhesive sheets (Examples 3, 4, and 14 to 16) obtained from the adhesive composition having the same composition as that of Comparative Example 6 except for the type of the tackifier resin.

The invention claimed is:

1. An adhesive composition comprising:
a (meth)acrylic polymer (A) which is a polymer of monomer components comprising 69.9 to 99 mass % of at least one (meth)acrylic acid ester consisting of an alkyl (meth)acrylate ester having an alkyl group having 4 to 12 carbon atoms, 0.5 to 15 mass % of a crosslinkable functional group-containing monomer other than an amino group-containing monomer, and 0.01 to 5 mass % of an amino group-containing monomer;
an acid-modified polyolefin (B);
at least one tackifier resin (C) selected from a rosin tackifier resin (C1) and a terpene phenol tackifier resin (C2), wherein the tackifier resin (C) has a weight average molecular weight of 500 to 4500 and a hydroxyl value of 15 to 150 mgKOH/g; and
a crosslinking agent (D),
the adhesive composition satisfying the following requirements (I) to (III):
(I) a value of a ball tack test performed by a J. Dow method using an adhesive layer having a thickness of 50 μm obtained from the adhesive composition is 5 or less,
(II) an adhesive force in measurement after an adhesive surface of an adhesive layer having a thickness of 50 μm obtained from the adhesive composition is bonded to a polypropylene plate and left to stand for 20 minutes in an environment at 80° C. is 10.0 N/25 mm or more, and (III) when a test piece in which an adhesive surface of an adhesive layer having a thickness of 50 μm obtained from the adhesive composition is bonded to a polypropylene plate in an area of 50 mm×20 mm is left to stand for 20 minutes in an environment at 80° C. and then a load of 200 g is applied to an end portion on one end side in a longitudinal direction of the test piece in an environment at 80° C., a peeling amount of the adhesive layer after 1 hour from the start of application of a load is 30 mm or less.

2. The adhesive composition according to claim 1, wherein the amino group of the amino group-containing monomer is a tertiary amino group.

3. The adhesive composition according to claim 1, wherein the (meth)acrylic polymer (A) is a polymer of monomer components comprising 69.9 to 94 mass % of the alkyl (meth)acrylate ester having an alkyl group having 4 to 12 carbon atoms, 0.5 to 15 mass % of the crosslinkable functional group-containing monomer other than the amino group-containing monomer, 0.01 to 5 mass % of the amino group-containing monomer, and 5 to 25 mass % of an alkyl (meth)acrylate ester having an alkyl group having 1 to 3 carbon atoms.

4. The adhesive composition according to claim 1, wherein the crosslinkable functional group-containing monomer other than the amino group-containing monomer is (meth)acrylic acid.

5. The adhesive composition according to claim 1, wherein the adhesive composition comprises 5 to 20 parts by mass of the acid-modified polyolefin (B) and 5 to 50 parts by mass of the tackifier resin (C) with respect to 100 parts by mass of the (meth)acrylic polymer (A).

6. The adhesive composition according to claim 1, wherein a haze of an adhesive layer having a thickness of 50 μm obtained from the adhesive composition is less than 35%.

7. The adhesive composition according to claim 1, wherein the (meth)acrylic polymer (A) is a polymer of monomer components comprising 74.9 to 99 mass % of the alkyl (meth)acrylate ester having an alkyl group having 4 to 12 carbon atoms, 0.5 to 15 mass % of the crosslinkable functional group-containing monomer other than the amino group-containing monomer, and 0.01 to 5 mass % of the amino group-containing monomer.

8. An adhesive sheet comprising:

a substrate; and an adhesive layer provided on the substrate, the adhesive layer being obtained from the adhesive composition according to claim 1.

*    *    *    *    *